United States Patent

Chang et al.

(10) Patent No.: US 9,514,044 B2
(45) Date of Patent: Dec. 6, 2016

(54) MULTI-LEVEL CACHE TRACKING TABLE

(71) Applicant: Hewlett-Packard Development Company, L.P., Houston, TX (US)

(72) Inventors: Jichuan Chang, Sunnyvale, CA (US); Doe Hyun Yoon, San Jose, CA (US); Parthasarathy Ranganathan, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 246 days.

(21) Appl. No.: 13/902,366

(22) Filed: May 24, 2013

(65) Prior Publication Data

US 2014/0351518 A1 Nov. 27, 2014

(51) Int. Cl.
G06F 12/08 (2016.01)

(52) U.S. Cl.
CPC ....... G06F 12/0811 (2013.01); G06F 12/0897 (2013.01); G06F 12/0888 (2013.01)

(58) Field of Classification Search
CPC .... G06F 12/0811; G06F 12/082; G06F 12/12; G06F 12/084; G06F 12/0888
See application file for complete search history.

(56) References Cited

U.S. PATENT DOCUMENTS

| | | | |
|---|---|---|---|
| 6,078,992 A | 6/2000 | Hum | |
| 6,647,466 B2 | 11/2003 | Steely, Jr. | |
| 7,228,388 B2 | 6/2007 | Hu et al. | |
| 2002/0194431 A1* | 12/2002 | Koo | G06F 12/0897 711/122 |
| 2003/0061450 A1* | 3/2003 | Mosur | G06F 12/0804 711/135 |
| 2004/0030950 A1* | 2/2004 | Kumar Arimilli | G06F 12/0811 714/5.1 |
| 2004/0059877 A1* | 3/2004 | Brown et al. | 711/144 |
| 2006/0112233 A1* | 5/2006 | Hu et al. | 711/138 |
| 2010/0023698 A1* | 1/2010 | Bell et al. | 711/133 |
| 2011/0082967 A1 | 4/2011 | Deshkar et al. | |
| 2012/0102269 A1* | 4/2012 | Ono | G06F 12/0862 711/122 |

OTHER PUBLICATIONS

M. Ekman, P. Stenstrom, and F. Dahlgren. TLB and Snoop Energy-Reduction using Virtual Caches in Low-Power Chip-Multiprocessors. In Proceedings of the 2002 international symposium on Low power electronics and design (ISLPED), pp. 243-246, New York, NY, USA, 2002. ACM.*

J. F. Cantin, M. H. Lipasti, and J. E. Smith. Improving multiprocessor performance with coarse-grain coherence tracking. In Proceedings of the 32nd annual international symposium on Computer Architecture(ISCA), pp. 246-257, Washington, DC, USA, 2005. IEEE Computer Society.*

(Continued)

*Primary Examiner* — David X Yi
*Assistant Examiner* — Francisco Grullon
(74) *Attorney, Agent, or Firm* — Hewlett Packard Enterprise Patent Department

(57) ABSTRACT

Disclosed herein are a computing system, integrated circuit, and method to enhance retrieval of cached data. A tracking table is used to initiate a search for data from a location specified in the table, if the data is not in a first level of a multi-level cache hierarchy.

20 Claims, 4 Drawing Sheets

(56) References Cited

OTHER PUBLICATIONS

J.F. Cantin, J.E. Smith, M.H. Lipasti, A. Moshovos, and B. Falsafi, Coarse-Grain Coherence Tracking: Regionscout and Region Coherence Arrays, IEEE Micro, vol. 26, No. 1, pp. 70-79, Jan. 2006.*
D. Kim, J. Ahn, J. Kim, J. Huh, Subspace snooping: Filtering snoops with operating system support, Proceedings of the the Nineteenth International Conference on Parallel Architectures and Compilation Techniques, PACT'10 Sep. 11-15, 2010.*
Chen, Zhifeng, Yuanyuan Zhou, and Kai Li. "Eviction-based Cache Placement for Storage Caches." USENIX Annual Technical Conference, General Track. 2003.*
Zichao Xie et al., "WHOLE: A Low Energy I-Cache with Separate Way History," 2009, pp. 137-143, IEEE, Available at: <iccd.et.tudelft.nl/2009/proceedings/137Xie,pdf>.

* cited by examiner

MULTI-LEVEL CACHE TRACKING TABLE

BACKGROUND

Processors heretofore may be accompanied with cache memory to reduce the average data retrieval time of the processor. Processor cache may have a multi-level hierarchy such that data may be moved to deeper levels of the hierarchy as the data is used less frequently. The data may be evicted from the hierarchy altogether, if the data remains idle in the hierarchy for a certain amount of time.

DETAILED DESCRIPTION

As noted above, processors may be equipped with a multi-level cache hierarchy. Data may be cached in a first level of the hierarchy and sequentially evicted to deeper levels as the data is used less frequently. Thus, data may be cached in a level of the hierarchy that coincides with its usage. If a unit of data remains idle for a certain amount of time, the unit of data may be completely evicted from the hierarchy and may return back to the main memory. However, when a processor requires a unit of data residing in the deepest level, the processor may search the hierarchy sequentially from the first level until the deepest level is reached. Unfortunately, these sequential searches may hinder a processor's performance. The affect on performance may be particularly noticeable in processors with very deep cache hierarchies. Furthermore, after using data retrieved from a deep cache level, the processor may simply return the data back to the first level, where it may be used sporadically until it is returned to deeper levels. However, higher cache levels should be reserved for data that is used more frequently.

In view of the foregoing, disclosed herein are a computing system, integrated circuit, and method for enhancing the retrieval of data cached in a multi-level cache hierarchy. In one example, a tracking table may be used to initiate a search for data from a location specified in the tracking table, if the data is not in a first level of the multi-level cache hierarchy. Thus, rather than searching sequentially from the first level in the hierarchy, the techniques disclosed herein permit the processor to begin its search from a more precise level. Furthermore, the tracking table location history may be used to evict a unit of data to a level that coincides with its usage. Such evictions may reserve higher levels for more frequently used data. Moreover, the techniques disclosed herein may also enhance the location of data in shared cached hierarchies during cache coherence transactions. The aspects, features and other advantages of the present disclosure will be appreciated when considered with reference to the following description of examples and accompanying figures. The following description does not limit the application; rather, the scope of the disclosure is defined by the appended claims and equivalents.

Figure 1:
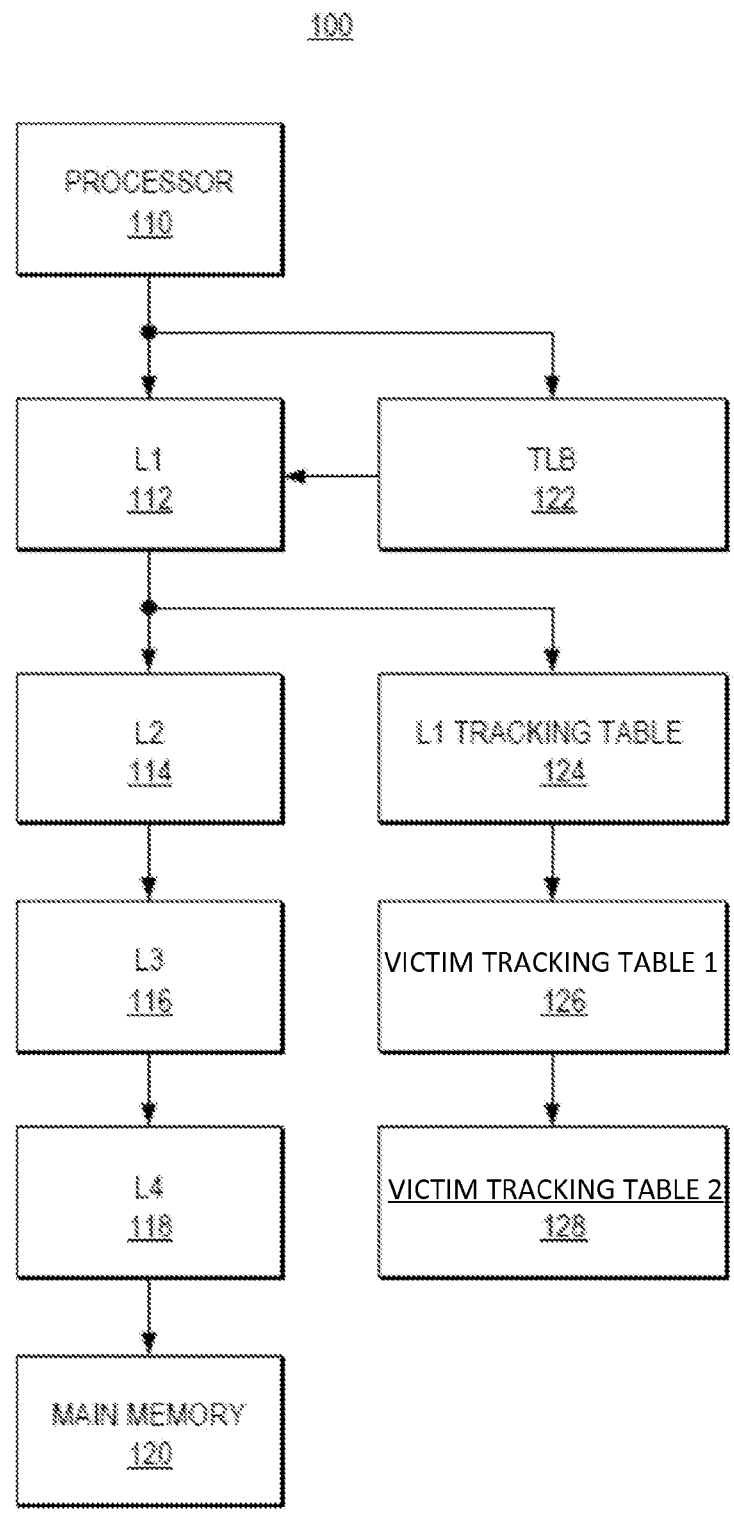
FIG. 1 is a block diagram of an example cache hierarchy in accordance with aspects of the present disclosure.

FIG. 1 presents a schematic diagram of an illustrative system 100 for executing the techniques disclosed herein. Processor 110 may be any number of well known processors, such as processors from Intel® Corporation. In another example, processor 110 may be an application specific integrated circuit ("ASIC"). Main memory 120 may comprise any data storage device accessible by the processor, such as a random access memory ("RAM") device or a dynamic random access memory ("DRAM") device. Alternatively, main memory 120 may comprise a hard-drive, ROM, CD-ROM, flash memories, write-capable or read-only memories. In a further example, main memory 120 may be divided into multiple memory segments organized as dual in-line memory modules ("DIMMs").

FIG. 1 also shows an example multi-level cache hierarchy comprising a first cache level 112, a second cache level 114, a third cache level 116, and a fourth cache level 118. These levels may be arranged in a variety of ways; for example, each level may be positioned inside or outside processor 110. Alternatively, first cache level 112 may be positioned inside processor 110 while the other cache levels remain outside the processor. As will be discussed further below, first level cache 112 may be used exclusively by processor 110 and the other cache levels may be shared with other processors. Thus, it is understood that FIG. 1 is for illustrative purposes and that a variety of configurations may be employed.

Also shown in FIG. 1, are example tracking tables. Tracking table 124 may comprise circuitry to maintain location information and location history for each unit of data that moves between main memory 120 and levels of the cache hierarchy. The circuitry of tracking table 124 may update the tracking history associated with a unit of data, when the data moves to a different level of the hierarchy or when the unit is evicted from the hierarchy. In a further example, processor 110 may begin a search for a unit of data from a location specified in tracking table 124, if the data is not in first level cache 112 (i.e., if there is a first level cache miss). That is, rather than searching the hierarchy sequentially, processor 110 may initiate a search for a given unit of data from a physical location specified in tracking table 124. The history in the tracking table may include one or multiple previous locations in which a unit of data resided.

By way of example, if a unit of data resides in fourth level cache 118, tracking table 124 may notify processor 110 of the data's location such that the processor goes directly to fourth level cache 118 rather than searching sequentially from the first level. Tracking table 124 may not always have the exact location of the data, but may have a more precise location. For example, tracking table 124 may notify processor 110 that the unit of data resides in third level cache 113. In this instance, processor 110 may begin its search in third level cache 113 and then go to fourth level cache 118. Tracking table 124 may be in near proximity to first level cache 112. Being physically near the first level may further enhance the retrieval of data, since the processor may always search for data in the first level before resorting to the tracking table.

In addition to enhancing the retrieval of data stored in the hierarchy, tracking table 124 may be used to determine the appropriate level for cached data. In one example, when the data is evicted from its current level (e.g., first level cache 112) processor 110 may move the unit of data to a different location that is determined based at least partially on the history of movements in tracking table 124. The new location may be determined in a variety of ways. For example, the processor may evict the data to its prior location. The history in the tracking table may be used as a predictor of the data's future usage. When a conventional processor is done using data obtained from a deep cache level, it may simply place it back in the first level, even though the data's future usage may be infrequent.

In another aspect, at least one victim tracking table may be used to store data evicted from tracking table 124. History associated with a unit of data may be evicted from tracking table 124 when the history is referenced less frequently by processor 110. FIG. 1 shows victim tracking table 126 and victim tracking table 128. As will be discussed further below, each unit of data may be associated with a data block in tracking table 124. In one example, processor 110 may evict a unit of data from the cache hierarchy, when the data block associated with the unit is evicted from tracking table 124 and victim tracking tables 126 and 128. As with the levels of the cache hierarchy, the tracking table and its associated victim tracking tables may be arranged in a variety of ways. For example, tracking table 124 may be arranged inside processor 110 and victim tracking tables 126 and 128 may be placed outside processor 110.

FIG. 1 also shows an example translation lookaside buffer ("TLB") 122 that may be used by the processor to translate virtual addresses into physical addresses. TLB 122 may be implemented as content-addressable memory ("CAM") such that the CAM search key is a virtual address received by a program (e.g., an operating system) and the output is a physical address of the unit of data in main memory 120. Despite being cached in the multi-level hierarchy, the physical address returned by TLB 122 may still refer to an address in main memory 120. As will be discussed in more detail below with regard to FIG. 3, this physical address may be used to find the location and location history of the unit of data in tracking table 124.

Figure 2:
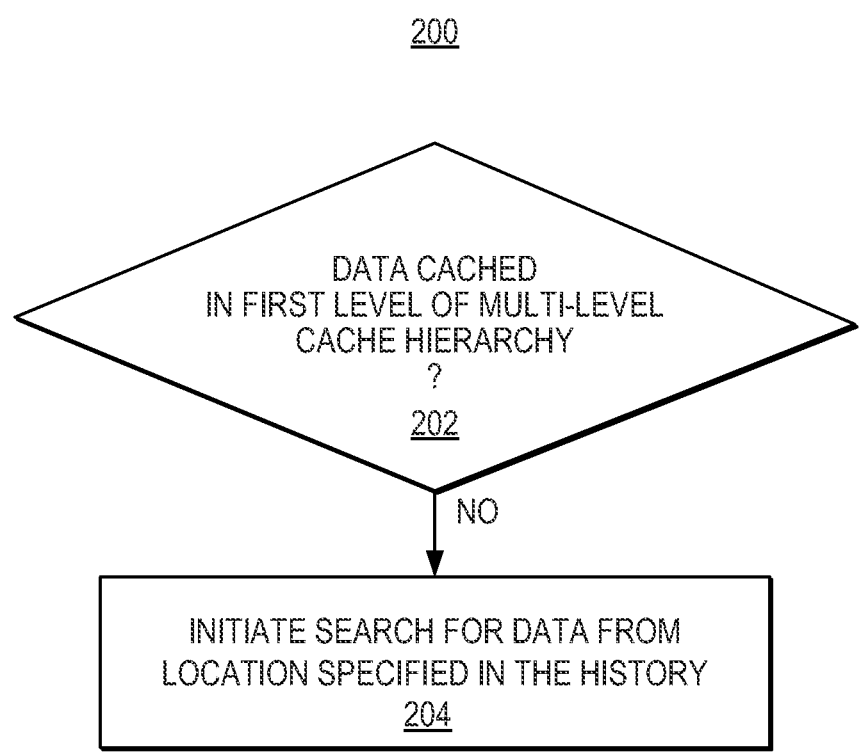
FIG. 2 is a flow diagram of an example method in accordance with aspects of the present disclosure.

FIG. 2 illustrates a flow diagram that summarizes an example method 200 for enhancing the retrieval of cached objects. As shown in block 202 of FIG. 2, it is determined whether data is cached in a first level of a multi-level cache hierarchy. Referring back to FIG. 1, processor 110 may search for a unit of data in first level cache 112. Referring back to FIG. 2, if it is determined that the data is not cached in a first level cache, a search for data may be initiated from a location specified in the history, as shown in block 204. Referring back to FIG. 1, rather than searching sequentially from second level cache 114 to fourth level cache 118, processor 110 may search tracking table 124 to obtain a more precise location of the sought after data.

Figure 3:
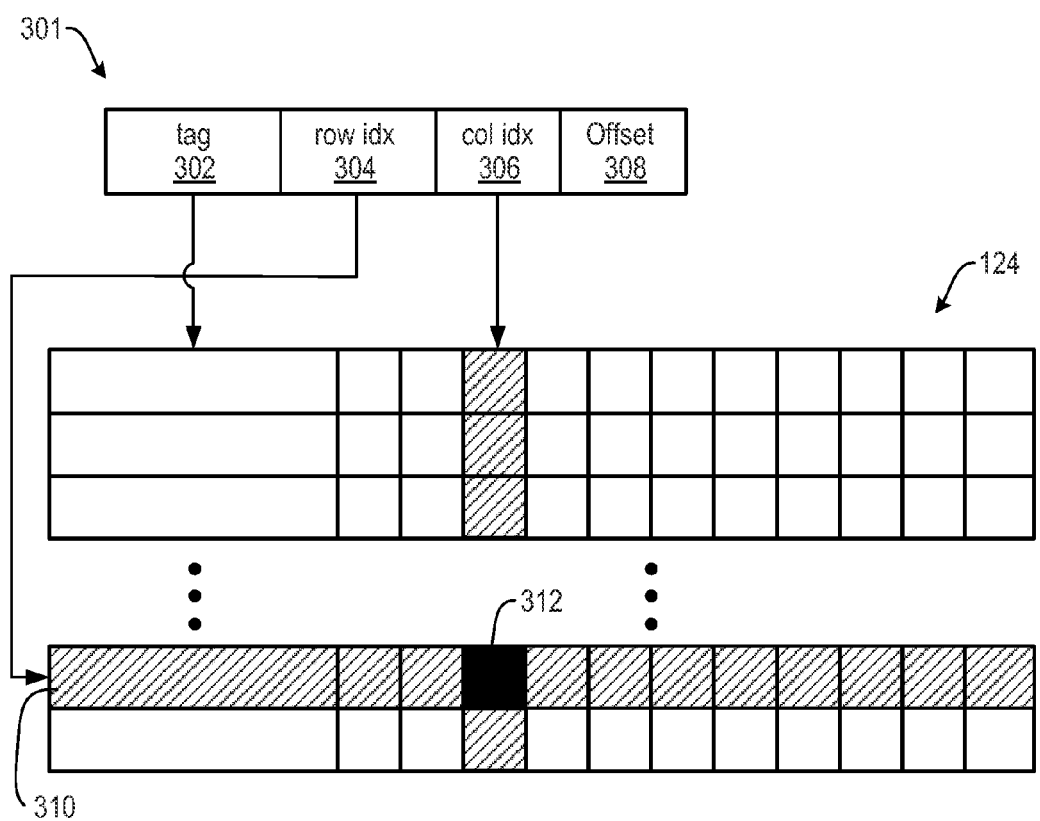
FIG. 3 is a block diagram of an example tracking table schema in accordance with aspects of the present disclosure.

Referring now to FIG. 3, a close up illustration of tracking table 124 is shown. Here, tracking table 124 is shown having rows of data broken up into individual data blocks. In one example, the location and location history associated with each unit of data may be stored in a data block of tracking table 124 that corresponds to each unit of data. In another example, each data block in tracking table 124 associated with a given unit of data may have a similar size as that of each data block in TLB 122 associated with the same unit of data. An insert of a data block in TLB 122 for a unit of data may cause an insert of a corresponding data block in tracking table 124. This may ensure that each unit of data that the processor may potentially use is accounted for in the tracking table. The similarity in data block size between tracking table 124 and TLB 122 may facilitate the synchronicity therebetween. In a further example, each row of data in tracking table 124 may be 4 kilobytes and each data block may be 64 bytes.

As noted above, each row in tracking table 124 may comprise multiple data blocks. Upon receiving a virtual address from a program, processor 110 may utilize TLB 122 to translate the virtual address to a physical address in main memory 120. If the unit of data is cached, processor 110 may initially search for the unit of data in first level cache 112. If the search results in a cache miss, processor 110 may search tracking table 124 using the physical address returned from TLB 122. By way of example, physical address 301 shown in FIG. 3 may be received by tracking table 124 from processor 110. Tracking table 124 may parse physical address 301 to locate the data block that corresponds to the unit of data sought by the processor. In one example, tracking table 124 may parse tag field 302, row index field 304, and column index field 306. Tracking table 124 may concatenate tag field 302 and row index field 304 to locate the row containing the data block associated with the sought after unit of data. In the example of FIG. 3, the unit of data in question is located in row 310. The tracking table may then use column index field 306 to locate the block of data in row 310. In the example of FIG. 3, the sought after data block is data block 312. Tracking table 124 may find the location of the sought after unit of data in data block 312 and return it to processor 110. In one example, tracking table 124 may return the data's last known location (e.g., in the cache hierarchy or in main memory). Processor 110 may then use the data block offset field 308 to locate the data within a cache line of the cache level, if the location provided by the tracking table is a level in the hierarchy.

Figure 4:
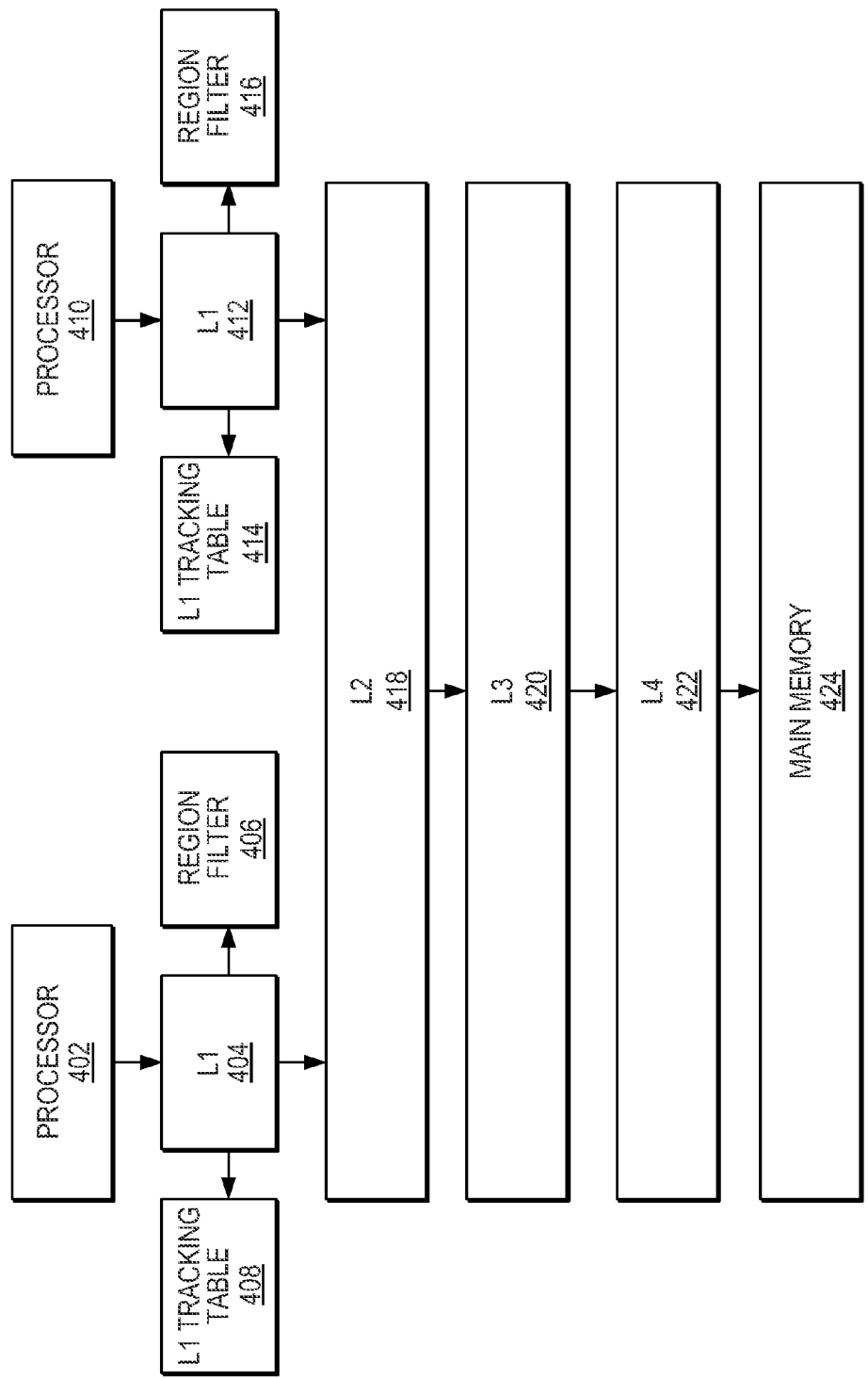
FIG. 4 is a block diagram of a cache coherent multi-core processor in accordance with aspects of the present disclosure.

Referring now to FIG. 4, an example multi-processor arrangement is depicted. In the example of FIG. 4, each processor 402 and 410 has its own private tracking table 408 and 414 respectively and its own private first level cache 404 and 412 respectively. FIG. 4 further shows a second cache level 418, a third cache level 420, and a fourth cache level 422 that are shared between processor 402 and processor 410. As with the cache hierarchy shown in FIG. 1, the cache hierarchy shown in FIG. 4 may be used by processor 402 and 410 to store units of data cached from main memory 424. Processors 402 and 410 are also shown having their own region filters 406 and 416 respectively. Each region filter may monitor the cache coherence status of a unit of data and filter out unnecessary cache coherence transactions. In one example, cache coherence may be defined as the consistency of data stored in a shared resource, such as the shared cache levels shown in FIG. 4.

The region filters may also use the tracking tables to facilitate the location of data. In one example, a region filter may analyze a cache coherence transaction history associated with a unit of data to determine whether the data is likely in a private cache memory of a different processor. For example, region filter 406 may use a cache coherence history to determine whether a sought after unit of data is likely located in first level cache memory 412, which is exclusive to processor 410. If the region filter determines that the data is not likely in the private cache memory of the different processor, the region filter may locate the unit of data based on the coherence transaction history and the location information associated with the unit of data in the tracking table. By way of example, region filter 406 may use cache coherence transaction history and location information in tracking table 408 associated with a unit of data to determine where the unit is located in the shared cache memory levels.

Advantageously, the foregoing computer system, integrated circuit, and method enhance the retrieval of data stored in a cache hierarchy. Rather than searching through the cache hierarchy sequentially, the processor may be provided with a more accurate location of the data. In this regard, processor manufacturers may implement deeper cache hierarchies without being concerned about a reduction in processor performance. The techniques disclosed herein may also enhance the retrieval of cached data in multiprocessor systems. Furthermore, the tracking table may be used for improved cache level eviction such that the data is evicted to a level that better corresponds with an expected usage of the data.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A computing system comprising:
a processor;
a multi-level cache hierarchy;
a main memory coupled to the processor; and
a tracking table to maintain location information and a location history for each unit of data that moves between the main memory and levels of the cache hierarchy, the processor to:
   search a first level cache of the hierarchy; and
   begin a search for a unit of data from a location specified in the tracking table, responsive to determining a cache miss in the first level cache of the hierarchy, the location specified in the tracking table being at a different level in the hierarchy than the first level cache and at a different level in the hierarchy than a sequentially next level cache after the first level cache.

2. The computing system of claim 1, wherein the processor is to:
determine whether to evict the unit of data from a level in the hierarchy in which the unit currently resides; and
if the unit of data is to be evicted, move the unit of data to another location that is determined based at least partially on associated location information in the tracking table.

3. The computing system of claim 1, wherein the tracking table is to update location information associated with the unit of data, when the data moves to a different level of the hierarchy or when the unit is evicted from the hierarchy.

4. The computing system of claim 1, wherein location information and location history associated with each unit of data is stored in a data block in the tracking table corresponding to each unit of data, the tracking table being in near proximity to the first level cache of the hierarchy.

5. The computing system of claim 4, further comprising a translation lookaside buffer, each data block in the buffer to have a similar size as that of each data block in the tracking table, the tracking table to insert the data block associated with each unit of data, when the processor inserts a translation lookaside buffer data block associated with each unit of data.

6. The computing system of claim 4, further comprising at least one victim tracking table to store data blocks evicted from the tracking table.

7. The computing system of claim 1, further comprising a region filter to:
analyze a cache coherence transaction history associated with the unit of data to determine whether the data is likely in a private cache memory of a different processor; and
if the data is not likely in the private cache memory of the different processor, locate the unit of data based on the coherence transaction history and the location information associated with the unit of data.

8. An integrated circuit comprising:
a processor;
a multi-level cache hierarchy; and
a tracking table to store tracking history for each unit of data that moves between a main memory coupled to the processor and the hierarchy, the processor to update the history when a unit of data moves to a level in the hierarchy or when the unit is evicted from the hierarchy, the processor further to:
   attempt to retrieve a given unit of data from a first level of the hierarchy; and
   initiate a search for the given unit of data from a physical location specified in the history responsive to the attempt to retrieve the given unit from the first level of the hierarchy resulting in a cache miss, the physical location specified in the history being at a different level in the hierarchy than the first level of the hierarchy and at a different level in the hierarchy than a sequentially next level cache after the first level of the hierarchy.

9. The integrated circuit of claim 8, wherein the processor is to:
determine whether to evict the given unit of data from a given level in the hierarchy in which the unit currently resides; and
if the given unit of data is to be evicted, move the unit to another location that is determined based at least partially on the tracking history associated with the data.

10. The integrated circuit of claim 8, wherein tracking history associated with the given unit of data is stored in a data block of the tracking table corresponding to the given unit of data, the tracking table being in near proximity to the first level of the hierarchy.

11. The integrated circuit of claim 10, further comprising a translation lookaside buffer, each data block in the buffer to have a similar size as that of each data block in the tracking table, the tracking table to insert the data block associated with the given unit of data, when the processor inserts a translation lookaside buffer data block associated with the given unit of data.

12. The integrated circuit of claim 10, further comprising at least one victim tracking table to store data blocks evicted from the tracking table.

13. The integrated circuit of claim 8, further comprising:
a region filter to analyze a cache coherence transaction history associated with the given unit of data to determine whether the data is likely in a private cache memory of a different processor; and
if the data is not likely in the private cache memory of the different processor, locate the given unit of data based on the coherence transaction history and the history associated with the given unit.

14. A method comprising:
reading, using a processor, a request to retrieve a unit of data;
searching, using the processor, a first level cache memory of a multi-level cache hierarchy;

determining, using the processor, that the unit of data is not cached in the first level cache memory of the multi-level cache hierarchy;

reading, using the processor, a tracking table comprising a history of movements made by the data between a main memory and the cache hierarchy; and initiating, using the processor, a search for the unit of data from a location specified in the history, the location specified in the history being at a different level in the cache hierarchy than the first level cache memory and at a different level in the hierarchy than a sequentially next level cache after the first level cache memory.

15. The method of claim 14, further comprising evicting, using the processor, the unit of data from a level in the hierarchy in which the unit currently resides to a prior location specified in the history, if it is determined that the unit of data is to be evicted from the level.

16. The method of claim 14, further comprising updating, using the tracking table, the history of movements, when the unit of data moves to a level in the hierarchy or when the unit of data is evicted from the hierarchy.

17. The method of claim 14, further comprising storing, using the tracking table, the history associated with the unit of data in a data block of the tracking table corresponding to the unit of data.

18. The method of claim 17, further comprising inserting, using the tracking table, the data block associated with the unit of data, when the processor inserts a translation lookaside buffer data block associated with the unit of data, each data block in the buffer having a similar size as that of each data block in the tracking table.

19. The method of claim 17, further comprising:

moving, using the tracking table, the history to a victim tracking table, when the history is evicted from the tracking table; and evicting, using the processor, the unit of data from the cache hierarchy, when the history associated with the unit is evicted from the tracking table and the victim tracking table.

20. The method of claim 14, further comprising:

analyzing, using a region filter, a cache coherence transaction history associated with the unit of data to determine whether the data is likely in a private cache memory of a different processor; and if the data is not likely in the private cache memory of the different processor, locating, using the region filter, the unit of data based on the coherence transaction history and the history associated with the unit.

* * * * *